(12) United States Patent
Qi et al.

(10) Patent No.: US 11,644,619 B2
(45) Date of Patent: *May 9, 2023

(54) OPTICAL SPLITTER CHIP, OPTICAL SPLITTER COMPONENT, OPTICAL SPLITTER APPARATUS, AND OPTICAL FIBER BOX

(71) Applicant: HUAWEI TECHNOLOGIES CO., LTD., Guangdong (CN)

(72) Inventors: Biao Qi, Wuhan (CN); Wei Xiong, Dongguan (CN); Sanxing Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,395

(22) Filed: Feb. 14, 2022

(65) Prior Publication Data

US 2022/0171128 A1    Jun. 2, 2022

Related U.S. Application Data

(63) Continuation of application No. 16/808,712, filed on Mar. 4, 2020, now Pat. No. 11,280,960, which is a
(Continued)

(51) Int. Cl.
*G02B 6/125* (2006.01)
*G02B 6/12* (2006.01)
(Continued)

(52) U.S. Cl.
CPC ......... *G02B 6/125* (2013.01); *G02B 6/12004* (2013.01); *G02B 6/12014* (2013.01);
(Continued)

(58) Field of Classification Search
None
See application file for complete search history.

(56) References Cited

U.S. PATENT DOCUMENTS 6,236,784 B1    5/2001  Ido
6,823,118 B2   11/2004  Hanashima
(Continued)

FOREIGN PATENT DOCUMENTS

CN         1576921      2/2005
CN       102918440      2/2013
(Continued)

OTHER PUBLICATIONS

Extended European Search Report issued in European Application No. 19856429.6 dated Oct. 16, 2020, 7 pages.
(Continued)

*Primary Examiner* — Michelle R Connelly
(74) *Attorney, Agent, or Firm* — Fish & Richardson P.C.

(57) ABSTRACT

One example optical splitter chip includes a substrate. The substrate is configured with an input port, configured to receive first signal light, an uneven optical splitting unit, configured to split the first signal light into at least second signal light and third signal light, where optical power of the second signal light is different from optical power of the third signal light, a first output port, configured to output the second signal light, an even optical splitting unit group, including at least one even optical splitting unit, configured to split the third signal light into at least two channels of equal signal light, where optical power of the at least two channels of equal signal light is the same, and at least two second output ports, which are in a one-to-one correspondence with the at least two channels of equal signal light.

20 Claims, 7 Drawing Sheets

Related U.S. Application Data continuation of application No. PCT/CN2019/076901, filed on Mar. 4, 2019.

(51) Int. Cl.
  *G02F 1/313* (2006.01)
  *G02B 6/122* (2006.01)
  *G02B 6/28* (2006.01)
  *G02B 6/44* (2006.01)

(52) U.S. Cl.
  CPC ......... *G02B 6/4448* (2013.01); *G02F 1/3137* (2013.01); *G02F 1/3138* (2013.01); *G02B 6/1228* (2013.01); *G02B 6/2808* (2013.01)

(56) References Cited

U.S. PATENT DOCUMENTS

| | | | |
|---|---|---|---|
| 7,283,710 B2 | 10/2007 | Sano et al. | |
| 7,773,851 B2 | 8/2010 | Castonguay et al. | |
| 11,280,960 B2 * | 3/2022 | Qi | G02B 6/4448 |
| 2003/0133663 A1 | 7/2003 | Orignac et al. | |
| 2005/0025427 A1 | 2/2005 | Dougherty et al. | |
| 2005/0041925 A1 | 2/2005 | Takahashi et al. | |
| 2007/0003190 A1 | 1/2007 | Saravanos et al. | |
| 2009/0304332 A1 | 12/2009 | Schweiker | |
| 2012/0237161 A1 | 9/2012 | Ross et al. | |
| 2018/0045905 A1 | 2/2018 | Cote et al. | |

FOREIGN PATENT DOCUMENTS

| | | |
|---|---|---|
| CN | 104714276 | 6/2015 |
| CN | 104735554 | 6/2015 |
| CN | 105591709 | 5/2016 |
| CO | 13016114 A | 1/2013 |
| JP | 2000121857 | 4/2000 |
| JP | 2003294962 | 10/2003 |
| JP | 2003315576 | 11/2003 |
| JP | 2010114622 A | 5/2010 |
| WO | 2016172886 | 11/2016 |

OTHER PUBLICATIONS

Office Action issued in Chinese Application No. 201980003683.7 dated May 21, 2021, 20 pages (with English translation).

Office Action issued in Chinese Application No. 201980003683.7 dated Nov. 12, 2021, 10 pages.

Office Action issued in Japanese Application No. 2020-520636 dated Jun. 28, 2021, 9 pages (with English translation).

PCT International Search Report and Written Opinion in International Application No. PCT/CN2019/076901, dated Nov. 28, 2019, 8 pages.

Office Action issued in Columbian Application No. NC2020/0004157 dated Jun. 24, 2022, 18 pages (with English translation).

* cited by examiner

OPTICAL SPLITTER CHIP, OPTICAL SPLITTER COMPONENT, OPTICAL SPLITTER APPARATUS, AND OPTICAL FIBER BOX

CROSS-REFERENCE TO RELATED APPLICATIONS

This application is a continuation of U.S. patent application Ser. No. 16/808,712, filed on Mar. 4, 2020, which is a continuation of International Application No. PCT/CN2019/076901, filed on Mar. 4, 2019. Both of the aforementioned applications are hereby incorporated by reference in their entireties.

TECHNICAL FIELD

This application relates to the field of optical communications, and more specifically, to an optical splitter chip, an optical splitter component, an optical splitter apparatus, and an optical fiber box in the field of optical communications.

BACKGROUND

An optical splitter is also referred to as a light splitter, and may split one channel of input light into a plurality of (two or more) channels of output light of same power.

A conventional optical splitter generally evenly splits light, and optical power of output waveguides is the same. Such an optical splitter is applicable to a conventional one-level optical splitting or two-level optical splitting scenario, and a networking mode is tree networking.

A conventional communications network uses a one-level or two-level optical splitting network, occupies a relatively large quantity of optical cable resources, and is suitable for deployment in densely populated blocks and high buildings. For some sparsely populated regions, such as a villa and a rural scenario, a quantity of terminal users connected to each optical line terminal (OLT) varies widely, and distances between different terminal users and the optical line terminal are also different, or even users in many regions are arranged in a chain. The conventional networking mode and optical splitter type are not suitable. Optical splitters that split optical signals unevenly may be cascaded. Optical signals having different power ratios are allocated based on distances to a central office device. In this way, investment of optical cable resources on different optical splitters can be greatly reduced.

Therefore, it is expected to provide a technology that can make a plurality of types of signal light that are different in power exist in a plurality of channels of signal light output by an optical splitter.

SUMMARY

This application provides an optical splitter chip, an optical splitter component, an optical splitter apparatus, and an optical fiber box, so that one beam of signal light may be split into signal light of at least two magnitudes of power, where signal light of one magnitude of power may be at least two beams.

According to a first aspect, an optical splitter chip is provided, including a substrate. The substrate is configured with: an input port, configured to receive first signal light; an uneven optical splitting unit, configured to split the first signal light into at least second signal light and third signal light, where optical power of the second signal light is different from optical power of the third signal light; a first output port, configured to output the second signal light; an even optical splitting unit group, including at least one even optical splitting unit, configured to split the third signal light into at least two channels of equal signal light, where optical power of the at least two channels of equal signal light is the same; and at least two second output ports, which are in a one-to-one correspondence with the at least two channels of equal signal light, where each second output port is configured to output corresponding equal signal light.

Based on the optical splitter chip provided in this application, the uneven optical splitting unit is disposed, and one of the two channels of signal light of different power output by the uneven optical splitting unit is output to the even optical splitting unit group, so that a plurality of channels of signal light of same power may be output by the even optical splitting unit group. Therefore, one beam of signal light may be split into signal light of at least two magnitudes of power, where signal light of one magnitude of power may be at least two beams. Therefore, a requirement of signal light of different power may be flexibly met, and practicability of an optical splitter chip may further be improved.

In addition, the uneven optical splitting unit and the even optical splitting unit are simultaneously configured on a same chip substrate, so that reliability is effectively improved and an optical power loss of signal light is lower. In addition, on a premise of implementing even optical splitting and uneven optical splitting, a size of a component is smaller, and a volume of the component occupied for mounting in an optical fiber box is reduced. In addition, in a production process, a worker does not need to assemble an even optical splitter and an uneven optical splitter; the engineering personnel may directly perform assembling during on-site construction, thereby reducing working hours and labor costs. In addition, material costs may also be reduced.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter chip provided in this application, the first output waveguide and the second output waveguide that have different widths are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

In this application, "coupling" of two components may be understood as that some or all of light emitted by one of the two components may be input to the other of the two components. The coupling of the two components may be understood as a contact connection between the two components, or may be understood as a non-contact connection between the two components. This is not directly limited in this application. Descriptions of same or similar parts are omitted below.

Based on the optical splitter chip provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

In addition, when an optical signal passes through the optical splitter chip, an optical mode is converted. To be specific, one channel of signal light is split into at least two channels of signal light. By disposing the tapered waveguide, an optical mode conversion process tends to be converted into a tapering process, thereby effectively reducing a signal light loss.

Optionally, an offset in the width direction of the tapered waveguide exists between a central axis of the input waveguide and a central axis of the tapered waveguide.

Therefore, total output power of the first output waveguide and the second output waveguide may be increased, and an optical signal loss is effectively reduced.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output ports.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter chip provided in this application, a central axis of the input waveguide and a central axis of the tapered waveguide are deviated in a width direction, so that total output power of an uneven optical splitting unit may be increased, thereby helping improve practicability of an optical splitter chip.

Optionally, the direction of the central axis of the input waveguide is parallel to the direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the even optical splitting unit is a planar lightwave circuit PLC.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a second aspect, an optical splitter component is provided, including an optical splitter chip. The optical splitter chip includes a substrate, configured with: an input port, configured to receive first signal light; an uneven optical splitting unit, configured to split the first signal light into at least second signal light and third signal light, where optical power of the second signal light is different from optical power of the third signal light; a first output port, configured to output the second signal light; an even optical splitting unit group, including at least one even optical splitting unit, configured to split the third signal light into at least two channels of equal signal light, where optical power of the at least two channels of equal signal light is the same; at least two second output ports, which are in a one-to-one correspondence with the at least two channels of equal signal light, where each second output port is configured to output corresponding equal signal light; a first optical fiber array, including a first fastener and a first optical fiber, where a first end of the first optical fiber is fastened in the first fastener, the first fastener is connected to the substrate of the optical splitter chip, and the first end of the first optical fiber is coupled to an input port of the optical splitter chip and is configured to transmit the received first signal light to the input port; and a second optical fiber array, including a second fastener, a second optical fiber, and at least two third optical fibers, where a first end of the second optical fiber is fastened in the second fastener, and first ends of the third optical fibers are separately fastened in the second fastener, the second fastener is connected to the substrate of the optical splitter chip, and the first end of the second optical fiber is coupled to a first output port of the optical splitter chip, and the first ends of the third optical fibers are coupled to the second output ports in a one-to-one correspondence.

Based on the optical splitter component provided in this application, the uneven optical splitting unit is disposed, and one of the two channels of signal light of different power output by the uneven optical splitting unit is output to the even optical splitting unit group, so that a plurality of channels of signal light of same power may be output by the even optical splitting unit group. Therefore, one beam of signal light may be split into signal light of at least two magnitudes of power, where signal light of one magnitude of power may be at least two beams. Therefore, a requirement of signal light of different power may be flexibly met, and practicability of an optical splitter chip may further be improved.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter component provided in this application, the first output waveguide and the second output waveguide that have different widths and a tapered waveguide are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

In this application, "coupling" of two components may be understood as that some or all of light emitted by one of the two components may be input to the other of the two components. The coupling of the two components may be understood as a contact connection between the two components, or may be understood as a non-contact connection between the two components. This is not directly limited in this application. Descriptions of same or similar parts are omitted below.

Based on the optical splitter chip provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

Optionally, an offset in the width direction of the tapered waveguide exists between a central axis of the input waveguide and a central axis of the tapered waveguide.

Therefore, total output power of the first output waveguide and the second output waveguide may be increased.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output port.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter component provided in this application, a center axis of the first waveguide and a center axis of the second waveguide are deviated in a width direction, so that total output power of an uneven optical splitting unit may be increased, thereby helping improve practicability of an optical splitter chip.

Optionally, the direction of the central axis of the input waveguide is parallel to the direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the even optical splitting unit is a planar lightwave circuit PLC.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a third aspect, an optical splitter apparatus includes an optical splitter chip. The optical splitter chip includes a substrate, configured with: an input port, configured to receive first signal light; an uneven optical splitting unit, configured to split the first signal light into at least second signal light and third signal light, where optical power of the second signal light is different from optical power of the third signal light; a first output port, configured to output the second signal light, an even optical splitting unit group, including at least one even optical splitting unit, configured to split the third signal light into at least two channels of equal signal light, where optical power of the at least two channels of equal signal light is the same; at least two second output ports, which are in a one-to-one correspondence with the at least two channels of equal signal light, where each second output port is configured to output corresponding equal signal light; a first optical fiber array, including a first fastener and a first optical fiber, where a first end of the first optical fiber is fastened in the first fastener, the first fastener is connected to the substrate of the optical splitter chip, and the first end of the first optical fiber is coupled to an input port of the optical splitter chip and is configured to transmit the received first signal light to the input port; a second optical fiber array, including a second fastener, a second optical fiber, and at least two third optical fibers, where a first end of the second optical fiber is fastened in the second fastener, and first ends of the third optical fibers are separately fastened in the second fastener, the second fastener is connected to the substrate of the optical splitter chip, and the first end of the second optical fiber is coupled to a first output port of the optical splitter chip, and the first ends of the third optical fibers are coupled to the second output ports in a one-to-one correspondence; a first connector, disposed on a second end of the first optical fiber; a second connector, disposed on a second end of the second optical fiber; and at least two third connectors, disposed at second ends of the third optical fibers in a one-to-one correspondence.

Based on the optical splitter apparatus provided in this application, the uneven optical splitting unit is disposed, and one of the two channels of signal light of different power output by the uneven optical splitting unit is output to the even optical splitting unit group, so that a plurality of channels of signal light of same power may be output by the even optical splitting unit group. Therefore, one beam of signal light may be split into signal light of at least two magnitudes of power, where signal light of one magnitude of power may be at least two beams. Therefore, a requirement of signal light of different power may be flexibly met, and practicability of an optical splitter chip may further be improved.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter apparatus provided in this application, the first output waveguide and the second output waveguide that have different widths and a tapered waveguide are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

In this application, "coupling" of two components may be understood as that some or all of light emitted by one of the two components may be input to the other of the two components. The coupling of the two components may be understood as a contact connection between the two components, or may be understood as a non-contact connection between the two components. This is not directly limited in this application. Descriptions of same or similar parts are omitted below.

Based on the optical splitter apparatus provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

Optionally, an offset in the width direction of the tapered waveguide exists between a central axis of the input waveguide and a central axis of the tapered waveguide.

Therefore, total output power of the first output waveguide and the second output waveguide may be increased.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output port.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter apparatus provided in this application, a center axis of the first waveguide and a center axis of the second waveguide are deviated in a width direction, so that total output power of an uneven optical splitting unit may be increased, thereby helping improve practicability of an optical splitter chip.

Optionally, the direction of the central axis of the input waveguide is parallel to the direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the even optical splitting unit is a planar lightwave circuit PLC.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a fourth aspect, an optical splitter chip is provided, including a substrate. The substrate is configured with: an input port, configured to receive first signal light; an uneven optical splitting unit, configured to split the first signal light into at least second signal light and third signal light, where optical power of the second signal light is different from optical power of the third signal light; a first output port, configured to output the second signal light; a second output port, configured to output the third signal light.

Based on the optical splitter chip provided in this application, the uneven optical splitting unit is disposed, so that one beam of signal light may be split into signal light of at least two magnitudes of power. Therefore, a requirement of signal light of different power may be flexibly met, and practicability of an optical splitter chip may further be improved.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter chip provided in this application, the first output waveguide and the second output waveguide that have different widths and a tapered waveguide are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

Based on the optical splitter chip provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

Optionally, an offset in the width direction of the tapered waveguide exists between a central axis of the input waveguide and a central axis of the tapered waveguide.

Therefore, total output power of the first output waveguide and the second output waveguide may be increased.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output port.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter chip provided in this application, a center axis of the first waveguide and a center axis of the second waveguide are deviated in a width direction, so that total output power of an uneven optical splitting unit may be increased, thereby helping improve practicability of an optical splitter chip.

Optionally, the direction of the central axis of the input waveguide is parallel to the direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a fifth aspect, an optical splitter component is provided, including an optical splitter chip. The optical splitter chip includes a substrate, configured with: an input port, configured to receive first signal light; an uneven optical splitting unit, configured to split the first signal light into at least second signal light and third signal light, where optical power of the second signal light is different from optical power of the third signal light; a first output port, configured to output the second signal light; second output ports, configured to output the third signal light; a first optical fiber array, including a first fastener and a first optical fiber, where a first end of the first optical fiber is fastened in the first fastener, the first fastener is connected to the substrate of the optical splitter chip, and the first end of the first optical fiber is coupled to an input port of the optical splitter chip and is configured to transmit the received first signal light to the input port; and a second optical fiber array, including a second fastener, a second optical fiber, and third optical fibers, where a first end of the second optical fiber is fastened in the second fastener, and first ends of the third optical fibers are separately fastened in the second fastener, the second fastener is connected to the substrate of the optical splitter chip, and the first end of the second optical fiber is coupled to a first output port of the optical splitter chip, and the first ends of the third optical fibers are coupled to the second output ports in a one-to-one correspondence.

Based on the optical splitter component provided in this application, the uneven optical splitting unit is disposed, so that one beam of signal light may be split into signal light of at least two magnitudes of power. Therefore, a requirement of signal light of different power may be flexibly met, and practicability of an optical splitter chip may further be improved.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter component provided in this application, the first output waveguide and the second output waveguide that have different widths and a tapered waveguide are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

Based on the optical splitter component provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

Optionally, an offset in the width direction of the tapered waveguide exists between a central axis of the input waveguide and a central axis of the tapered waveguide.

Therefore, total output power of the first output waveguide and the second output waveguide may be increased.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output port.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter component provided in this application, a center axis of the first waveguide and a center axis of the second waveguide are deviated in a width direction, so that total output power of an uneven optical splitting unit may be increased, thereby helping improve practicability of an optical splitter chip.

Optionally, the direction of the central axis of the input waveguide is parallel to the direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the even optical splitting unit is a planar lightwave circuit PLC.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a sixth aspect, an optical splitter apparatus includes an optical splitter chip. The optical splitter chip includes a substrate, configured with: an input port, configured to receive first signal light; an uneven optical splitting unit, configured to split the first signal light into at least second signal light and third signal light, where optical power of the second signal light is different from optical power of the third signal light; a first output port, configured to output the second signal light; second output ports, configured to output the third signal light, a first optical fiber array, including a first fastener and a first optical fiber, where a first end of the first optical fiber is fastened in the first fastener, the first fastener is connected to the substrate of the optical splitter chip, and the first end of the first optical fiber is coupled to an input port of the optical splitter chip and is configured to transmit the received first signal light to the input port; a second optical fiber array, including a second fastener, a second optical fiber, and at least two third optical fibers, where a first end of the second optical fiber is fastened in the second fastener, and first ends of the third optical fibers are separately fastened in the second fastener, the second fastener is connected to the substrate of the optical splitter chip, and the first end of the second optical fiber is coupled to a first output port of the optical splitter chip, and the first ends of the third optical fibers are coupled to the second output ports in a one-to-one correspondence; a first connector, disposed on a second end of the first optical fiber; a second connector, disposed on a second end of the second optical fiber; and at least two third connectors, disposed at second ends of the third optical fibers in a one-to-one correspondence.

Based on the optical splitter apparatus provided in this application, the uneven optical splitting unit is disposed, so that one beam of signal light may be split into signal light of at least two magnitudes of power. Therefore, a requirement of signal light of different power may be flexibly met, and practicability of an optical splitter chip may further be improved.

Optionally, the uneven optical splitting unit includes: an input waveguide, configured to transmit the first signal light received by the input port; a first output waveguide, configured to receive the first signal light, and output the second signal light to the first output port; a second output waveguide, configured to receive the first signal light, and output the third signal light to the even optical splitting unit group. The first output waveguide has a third width, the second output waveguide has a fourth width, and the third width is different from the fourth width.

Based on the optical splitter apparatus provided in this application, the first output waveguide and the second output waveguide that have different widths and a tapered waveguide are configured, so that an uneven optical splitting unit may be easily formed by using the waveguides, thereby facilitating miniaturization of an optical splitter chip.

Optionally, the uneven optical splitting unit further includes a tapered waveguide. The tapered waveguide includes an input end and an output end, where the input end is coupled to the input waveguide, the first signal light output from the input waveguide is input to the tapered waveguide from the input end and is transmitted to the output end, a first width of the output end is greater than a second width of the input end, the first output waveguide and the second output waveguide are arranged along a width direction of the tapered waveguide, and the first output waveguide and the second output waveguide are separately coupled to the output end of the tapered waveguide.

In this application, "coupling" of two components may be understood as that some or all of light emitted by one of the two components may be input to the other of the two components. The coupling of the two components may be understood as a contact connection between the two components, or may be understood as a non-contact connection between the two components. This is not directly limited in this application. Descriptions of same or similar parts are omitted below.

Based on the optical splitter apparatus provided in this application, the tapered waveguide is disposed, and a width of the input waveguide does not need to be greater than a sum of the first output waveguide and the second output waveguide. In this way, uneven optical splitting may be easily implemented, and practicability of this application is further improved.

Optionally, an offset in the width direction of the tapered waveguide exists between a central axis of the input waveguide and a central axis of the tapered waveguide.

Therefore, total output power of the first output waveguide and the second output waveguide may be increased.

Optionally, in the width direction of the tapered waveguide, the central axis of the input waveguide is located on a side that is of the central axis of the tapered waveguide and that is close to an output waveguide with a larger width (or larger optical power) of the first output waveguide and the second output waveguide.

Optionally, a direction of the central axis of the input waveguide is parallel to a direction of the central axis of the tapered waveguide.

Optionally, a larger ratio of the third width to the fourth width indicates a larger optical power ratio of the second signal light to the third signal light.

Optionally, the third width is greater than the fourth width.

In this case, power of signal light output from the first output port may be higher than power of signal light output from the second output port.

Therefore, because the power of the signal light output from the first output port is higher, the signal light may be used as signal light transmitted on a backbone line. In other words, the signal light output from the first output port may be transmitted to a far-end device.

Because the power of the signal light output from the second output ports is lower, the signal light may be used as signal light transmitted on a branch line. In other words, the signal light output from the second output ports may be transmitted to a near-end device.

In this application, a width of a component may be a size of the component in a direction perpendicular to the central axis of the input waveguide (or the tapered waveguide) on the configuration plane.

Optionally, in the width direction of the tapered waveguide, the central axis of the input waveguide is located on a side that is of the central axis of the tapered waveguide and that is close to an output waveguide with a larger width.

Based on the optical splitter apparatus provided in this application, a center axis of the first waveguide and a center axis of the second waveguide are deviated in a width direction, so that total output power of an uneven optical splitting unit may be increased, thereby helping improve practicability of an optical splitter chip.

Optionally, a direction of the central axis of the input waveguide is parallel to a direction of the central axis of the tapered waveguide.

Optionally, the input waveguide has a fifth width. The fifth width is greater than or equal to the third width, and the fifth width is greater than or equal to the fourth width.

Optionally, the input waveguide has the fifth width, and the fifth width is the same as the second width.

Optionally, the input waveguide, the tapered waveguide, the first output waveguide and the second output waveguide are planar lightwave circuits PLCs.

Optionally, the first output waveguide and the second output waveguide are bent waveguides.

Optionally, the even optical splitting unit is a planar lightwave circuit PLC.

Optionally, the optical splitter chip further includes a cover, covering the uneven optical splitting unit and the even optical splitting unit group.

In other words, the uneven optical splitting unit and the even optical splitting unit group are configured between the substrate and the cover.

According to a seventh aspect, an optical fiber box is provided, including the optical splitter apparatus according to any aspect of the third aspect or the sixth aspect and any one of possible implementations of the third aspect or the sixth aspect, and a housing for accommodating the optical splitter apparatus.

DESCRIPTION OF EMBODIMENTS

The following describes technical solutions of this application with reference to accompanying drawings.

Figure 1:
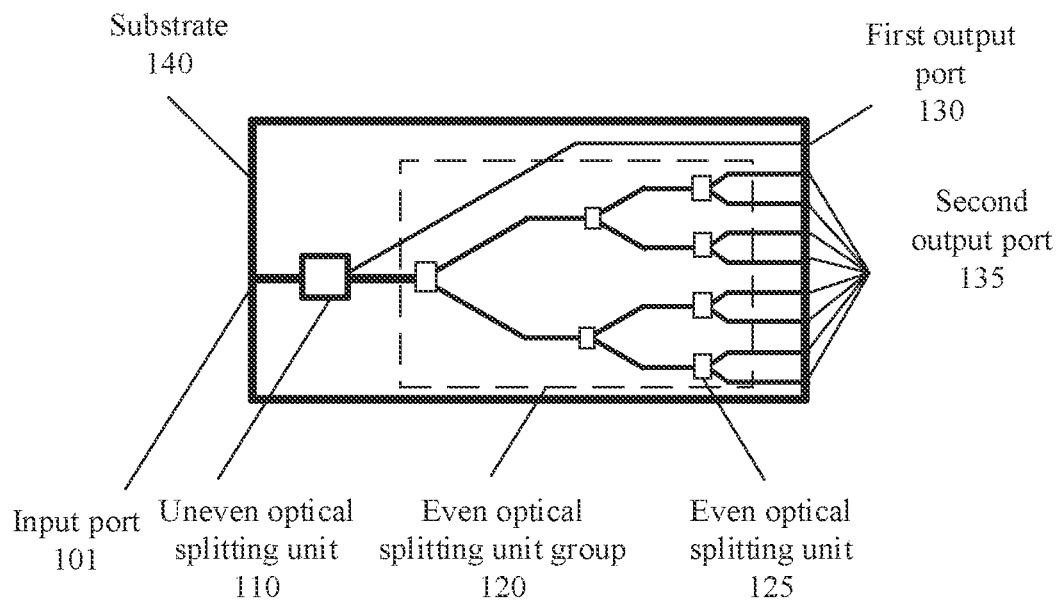
FIG. 1 is a schematic structural diagram of an example of an optical splitter chip according to this application.

FIG. 1 is a schematic structural diagram of an optical splitter chip 100 according to this application.

As shown in FIG. 1, the optical splitter chip 100 includes: a substrate 140.

An input port 101, an uneven optical splitting unit 110, an even optical splitting unit group 120, a first output port 130, and a plurality of second output ports 135 are configured on the substrate 140.

The substrate 140 includes a configuration plane, on which the uneven optical splitting unit 110 and the even optical splitting unit group 120 are configured.

The even optical splitting unit group 120 includes at least one even optical splitting unit 125.

The following describes a relationship between components of the optical splitter chip 100 with reference to a flow direction of signal light in the optical splitter chip 100.

The input port 101 is configured to receive signal light, for example, first signal light, sent from the outside.

For example, as shown in FIG. 1, the input port 101 may be configured at an edge of the substrate 140.

As shown in FIG. 1, the input port 101 is coupled to an input end of the uneven optical splitting unit 110. In other words, first signal light received from the input port 101 may be input to the uneven optical splitting unit 110.

In this application, the input port 101 may be independently configured.

Alternatively, the input port 101 may be a part of the uneven optical splitting unit 110, and specifically, the input port 101 may also be a port that is on the uneven optical splitting unit 110 and that receives signal light from the outside.

In this application, "coupling" of two components may be understood as that some or all of light emitted by one of the two components may be input to the other of the two components. The coupling of the two components may be understood as a contact connection between the two components, or may be understood as a non-contact connection between the two components. This is not directly limited in this application. Descriptions of same or similar parts are omitted below.

The uneven optical splitting unit 110 may split the first signal light into two channels of signal light, for example, second signal light and third signal light. Power of the second signal light and the third signal light that are obtained after splitting by the uneven optical splitting unit 110 is different. Subsequently, the process is described in detail.

As shown in FIG. 1, an output end of the uneven optical splitting unit 110 is coupled to the first output port 130. In other words, one of the two channels of signal light obtained after splitting by the uneven optical splitting unit 110, for example, the second signal light, is input to the first output port 130.

In this application, the first output port 130 may be independently configured.

Alternatively, the first output port 130 may be a part of the uneven optical splitting unit 110. Specifically, the first output port 130 may be a part of the output end (specifically, an output end of the second signal light) of the uneven optical splitting unit 110 that sends signal light to the outside. In addition, as shown in FIG. 1, another output end of the uneven optical splitting unit 110 is coupled to an input end of the even optical splitting unit group 120. In other words, the other of the two channels of signal light obtained after splitting by the uneven optical splitting unit 110, for example, the third signal light, is input to the even optical splitting unit group 120.

Each even optical splitting unit 125 in the even optical splitting unit group 120 may split the input signal light into two channels of signal light of same power. In other words, the even optical splitting unit 125 may split the third signal light into a plurality of channels of equal signal light of same power. Subsequently, the process is described in detail.

In addition, as shown in FIG. 1, a plurality of output ends of the even optical splitting unit group 120 are in a one-to-one correspondence with the plurality of second output ports 135. In other words, a plurality of (at least two) channels of equal signal light obtained after splitting by the even optical splitting unit group 120 are respectively input to different second output ports 135 by using different output ends.

In this application, the second output ports 135 may be independently configured.

Alternatively, the second output ports 135 may be a part of the even optical splitting unit group 120. Specifically, the second output ports 135 may be a part of the output end (specifically, an output end of the equal signal light) of the even optical splitting unit group 120 that outputs signal light to the outside.

For example, as shown in FIG. 1, the first output port 130 and the second output ports 135 may be configured at the edge of the substrate 140.

In other words, a part of output ends of the uneven optical splitting unit 110 may be located at the edge of the substrate 140, and the first output port 130 may be a part of an output end that is on the uneven optical splitting unit 110 and that is configured at the edge of the substrate 140.

In addition, a part or all of the output ends of the even optical split unit group 120 may be located at the edge of the substrate 140, and the second output port 135 may be a part of an output end on the even optical splitting unit group 120 that is configured at the edge of the substrate 140.

It may be understood that the foregoing "an input port 101, an uneven optical splitting unit 110, an even optical splitting unit group 120, a first output port 130, and a plurality of second output ports 135 are configured on the substrate 140" includes a case in which the input port 101, the first output port 130, and the second output ports 135 are independently configured, and a case in which the input port 101, the first output port 130, and the second output ports 135 are not independently configured (for example, the input port 101 is a part of the uneven optical splitting unit 110, the first output port 130 is a part of the uneven optical splitting unit 110, and the second output ports 135 are a part of the even optical splitting unit group 120).

The following describes in detail a structure and a function of an example of the uneven optical splitting unit 110 in this application with reference to FIG. 2 to FIG. 5.

Figure 2:
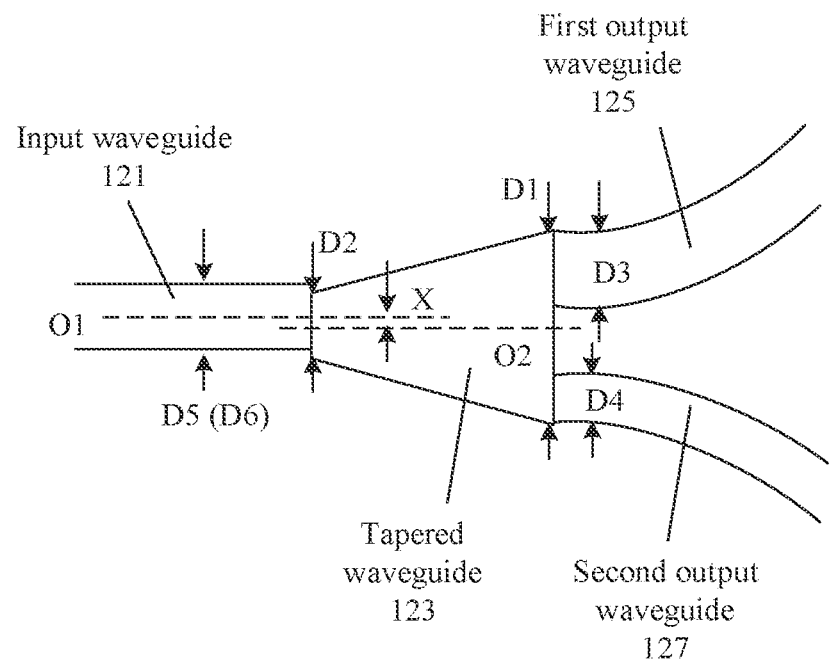
FIG. 2 is a schematic structural diagram of an example of an uneven optical splitting unit according to this application.
Figure 3:
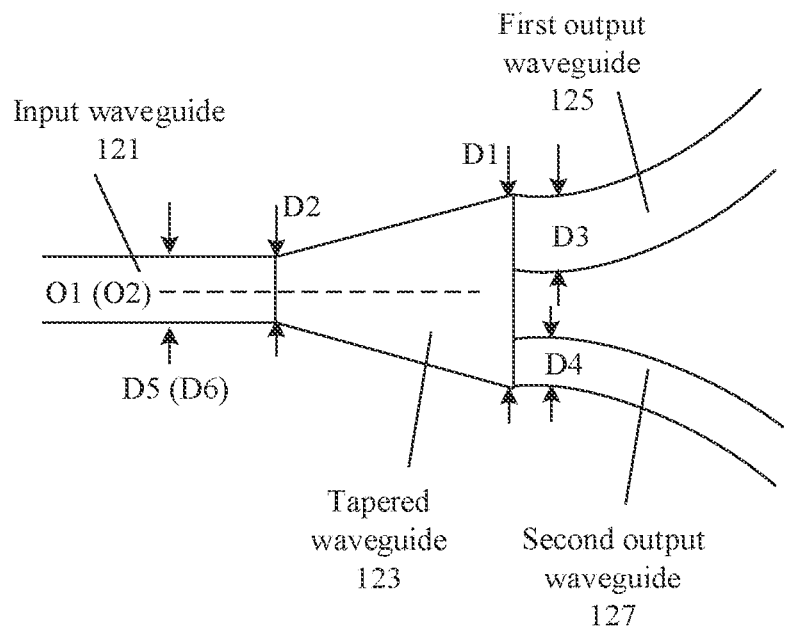
FIG. 3 is a schematic structural diagram of another example of an uneven optical splitting unit according to this application.
Figure 4:
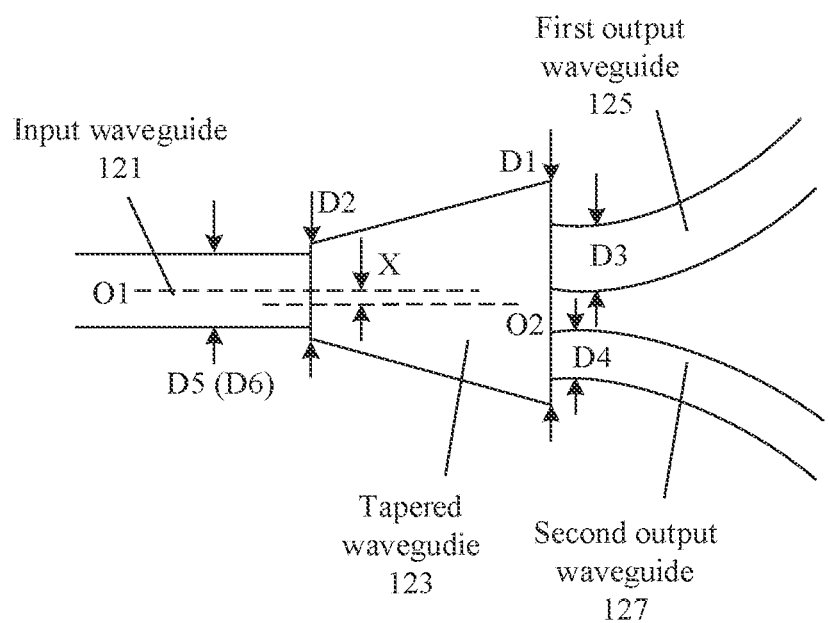
FIG. 4 is a schematic structural diagram of still another example of an uneven optical splitting unit according to this application.

As shown in FIG. 2 to FIG. 4, the uneven optical splitting unit 110 includes:

an input waveguide 121, a tapered waveguide 123, a first output waveguide 125, and a second output waveguide 127.

The following describes a relationship between components of the uneven optical splitting unit 110 with reference to a flow direction of signal light in the uneven optical splitting unit 110.

The input waveguide 121 is configured to input first signal light from the input port 101.

As an example instead of a limitation, the input waveguide 121 may be a planar lightwave circuit (PLC).

The planar lightwave circuit means that an optical waveguide is located on a plane.

An optical waveguide is a dielectric apparatus that guides an optical wave to propagate in the optical waveguide, and is also referred to as a dielectric optical waveguide.

As an example instead of a limitation, in this application, the planar lightwave circuit may be manufactured by using a semiconductor technology (technologies such as photo-etching, corrosion, and developing). An optical waveguide array is located on an upper surface of the chip, and a splitting function is integrated on the chip. Then, multi-channel optical fiber arrays of an input end and an output end are separately coupled and encapsulated at two ends of the chip.

For example, a material of the planar lightwave circuit may include but is not limited to glass, silicon dioxide ($SiO_2$), lithium niobate ($LiNbO_3$), an III-V semiconductor compound (such as indium phosphide (InP) or gallium arsenide (GaAs)), silicon-on-insulator (SOI), silicon oxynitride (SiON), macromolecule polymer, and the like.

For example, the input waveguide 121 may be a straight waveguide, or the input waveguide 121 may be a bent waveguide. This is not particularly limited in this application.

The input waveguide 121 has a waveguide center axis (which may also be referred to as an optical axis). To be specific, signal light (for example, the first signal light) may be transmitted in the input waveguide 121 substantially along a direction of the waveguide center axis of the input waveguide 121. For ease of understanding and differentiation, the waveguide center axis of the input waveguide 121 is denoted as an axis O1.

As shown in FIG. 2 to FIG. 4, in this application, a cross section of the input waveguide 121 may be formed as a rectangle. In other words, a width (denoted as D6) of an input end of the input waveguide 121 may be the same as or approximately the same as a width (denoted as D5) of an output end of the input waveguide 121. A value of D5 or D6 may be randomly set based on an actual application. This is not particularly limited in this application.

In this application, a "width" of a component may be understood as a size of the component in a direction perpendicular to the optical axis O1 on the configuration plane.

In other words, in this application, a "width direction" may be understood as a direction perpendicular to the optical axis O1 on the configuration plane.

As shown in FIG. 2 to FIG. 4, the output end of the input waveguide 121 is coupled to the input end of the tapered waveguide 123. In other words, the first signal light output from the input waveguide 121 may be input to the tapered waveguide 123.

As an example instead of a limitation, the tapered waveguide 123 may be a planar lightwave circuit.

The tapered waveguide 123 has a waveguide center axis (which may also be referred to as an optical axis). To be specific, signal light (for example, the first signal light) may be transmitted in the tapered waveguide 123 substantially along a direction of the waveguide center axis of the tapered waveguide 123. For ease of understanding and differentiation, the waveguide center axis of the tapered waveguide 123 is denoted as an axis O2.

When the input waveguide 121 is a straight waveguide, the axis O1 may be parallel or approximately parallel to the axis O2.

When the input waveguide 121 is a bent waveguide, the input waveguide 121 has a straight line part, and the tapered waveguide 123 is coupled to the straight line part of the input waveguide 121. In this case, the axis O1 of the straight line part of the input waveguide 121 may be parallel to or approximately parallel to the axis O2.

As shown in FIG. 2 to FIG. 4, in this application, the tapered waveguide 123 may be formed as a trapezoid (for example, an isosceles trapezoid). In other words, a width (denoted as D2) of the input end of the tapered waveguide 123 may be less than a width (denoted as D1) of the output end of the tapered waveguide 123. A value of D1 or D2 may be randomly set based on an actual application, provided that it is ensured that D2 is less than D1. This is not particularly limited in this application.

Figure 5:
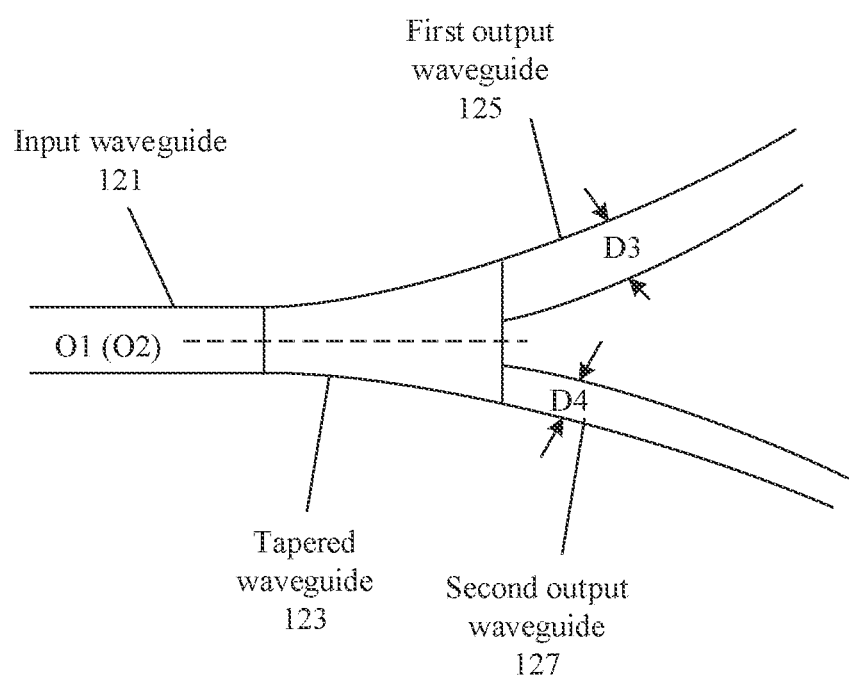
FIG. 5 is a schematic structural diagram of still another example of an uneven optical splitting unit according to this application.

It should be understood that, the shape of the tapered waveguide 123 listed above is merely an example for description, and this application is not limited thereto. For example, as shown in FIG. 5, a tapered region of the tapered waveguide 123 may alternatively be curved. In other words, a side that connects the input end and the output end of the tapered waveguide 123 may be arc-shaped.

In addition, as an example instead of a limitation, as shown in FIG. 2, in this application, D2 and D5 may be the same or approximately the same.

Alternatively, as shown in FIG. 4, D2 may be greater than or equal to D5.

As shown in FIG. 2, in this application, an end face (denoted as an end face 1) that is of the input waveguide 121 and that is coupled to or connected to the tapered waveguide 123 and an end face (denoted as an end face 2) of the input end of the tapered waveguide 123 may be staggered in a width direction.

In other words, a projection of one sidewall of the input waveguide 121 on the end face 2 is within a width range of the end face 2, and a projection of the other sidewall of the input waveguide 121 on the end face 2 is outside the width range of the end face 2.

Alternatively, as shown in FIG. 4, in this application, the end face 1 may fall within the width range of the end face 2.

In other words, the projections of the two sidewalls of the input waveguide 121 on the end face 2 are within the width range of the end face 2.

As shown in FIG. 2 to FIG. 4, the output end of the tapered waveguide 123 is coupled to the input end of the first output waveguide 125. In other words, a part of the first signal light (denoted as second signal light) output from the output end of the tapered waveguide 123 may be input to the first output waveguide 125.

When an optical signal passes through the optical splitter chip, an optical mode is converted. To be specific, one channel of signal light is split into at least two channels of signal light. By disposing the tapered waveguide, an optical mode conversion process tends to be a tapered conversion process, thereby effectively reducing a signal light loss.

As an example instead of a limitation, the first output waveguide 125 may be a planar lightwave circuit.

For example, the input waveguide 121 may be a straight waveguide or a bent waveguide.

In addition, as shown in FIG. 2 to FIG. 4, the output end of the tapered waveguide 123 is coupled to an input end of the second output waveguide 127. In other words, a part of the first signal light (denoted as third signal light) output from the output end of the tapered waveguide 123 may be input to the second output waveguide 127.

For example, the second output waveguide 127 may be a straight waveguide or a bent waveguide.

As shown in FIG. 2 to FIG. 4, in this application, the first output waveguide 125 and the second output waveguide 127 are arranged along a width direction of the tapered waveguide 123 (specifically, the output end of the tapered waveguide 123).

For example, the first output waveguide 125 and the second output waveguide 127 may be respectively located on two sides of the axis O2. For example, as shown in FIG. 2 to FIG. 4, the first output waveguide 125 may be located on an upper side of the axis O2, and the second output waveguide 127 may be located on a lower side of the axis O2.

In an embodiment of this application, a width (denoted as D3) of the first output waveguide 125 is different from a width (denoted as D4) of the second output waveguide 127.

For example, if it is expected that power of the second signal light is greater than power of the third signal light, D3 may be greater than D4.

For another example, if it is assumed that power of the first signal light is W1, the power of the second signal light is W2, a ratio of D4 to D3 is set to K1 (that is, K1=D4/D3), and a percentage of W2 in W1 is K2 (that is, K2=W2/W1× 100%), K1 is in a correspondence with K2.

For example, a larger K1 indicates a smaller K2.

In other words, a larger value of 1/K1 (namely, D3/D4) indicates a larger K2.

In other words, a larger value of D3/D4 indicates a larger value of W1/W2.

For another example, in this application, the correspondence between K1 and K2 may vary with a quantity of second output ports 135.

Figure 6:
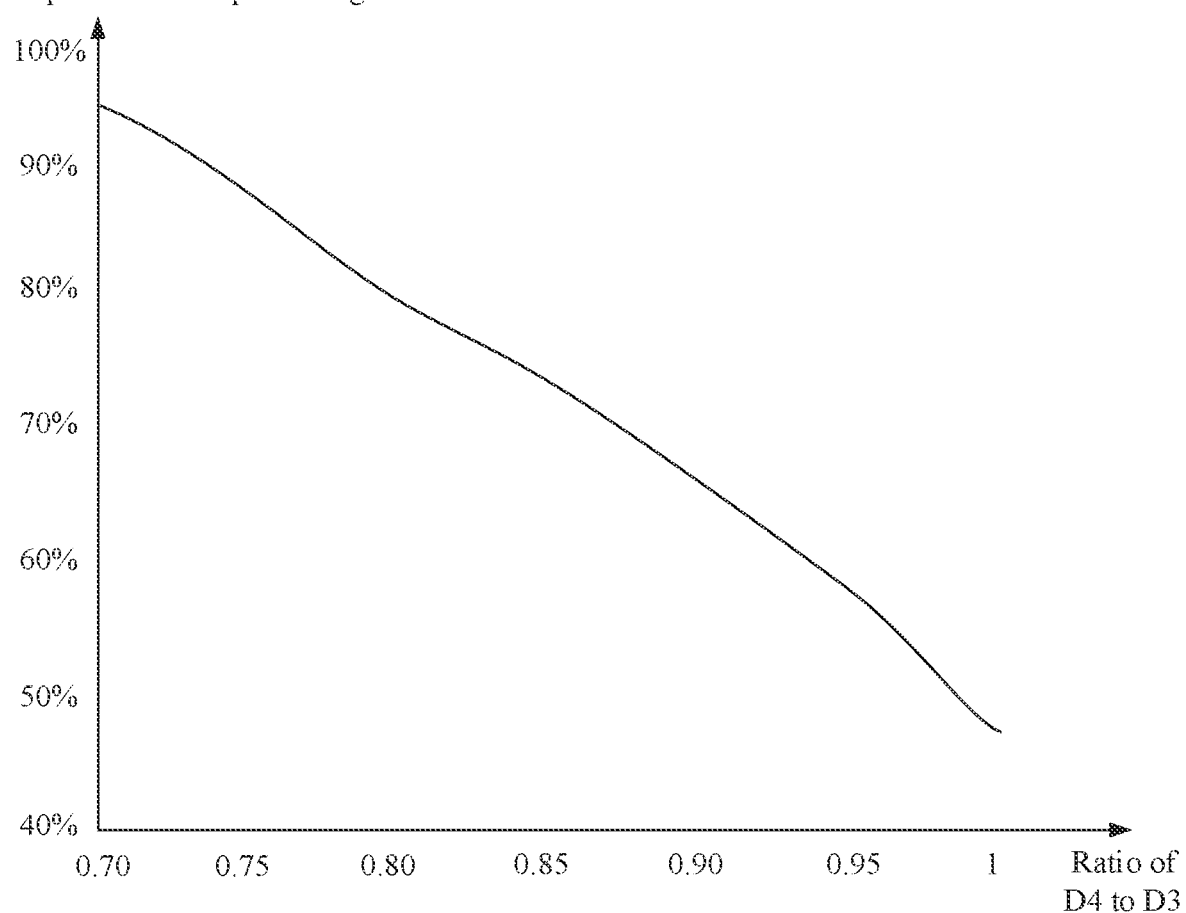
FIG. 6 is a schematic diagram of a relationship between a waveguide width and power of an uneven optical splitting unit according to this application.

FIG. 6 shows an example of a change trend of a relationship between K2 and K1 when the quantity of second output ports 135 is 8.

For example, if there are eight second output ports 135, when K2=70%, a value of K1 may be 0.82.

For another example, if there are four second output ports 135, when K2=70%, the value of K1 may be 0.88.

As an example instead of a limitation, in this application, the first output waveguide 125 and the second output waveguide 127 may be configured within a width range of the output end of the tapered waveguide 123.

For example, as shown in FIG. 2 or FIG. 3, an edge that is of the first output waveguide 125 and that is away from the axis O2 may be aligned or approximately aligned with an edge that is of the output end of the tapered waveguide 123 and that is away from the axis O2. In addition, an edge that is of the second output waveguide 127 and that is away from the axis O2 may be aligned or approximately aligned with the edge that is of the output end of the tapered waveguide 123 and that is away from the axis O2. In other words, if a distance between the edge of the first output waveguide 125 that is away from the axis O2 and an edge of the first output waveguide 125 away from the axis O2 is W, W may be equal to D1.

Alternatively, as shown in FIG. 4, the edge that is of the first output waveguide 125 and that is away from the axis O2 may be located inside the edge that is of the output end of the tapered waveguide 123 that is away from the axis O2, and the edge that is of the second output waveguide 127 and that is away from the axis O2 may be located inside the edge that is of the output end of the tapered waveguide 123 and that is away from the axis O2. In other words, W may be less than D1.

Optionally, in this application, D4 may be less than or equal to D2 (or D5), and D3 may be less than or equal to D2 (or D5).

As shown in FIG. 2 or FIG. 4, in this application, there may be an offset between the axis O1 and the axis O2. Specifically, an offset in a waveguide width direction (or a direction perpendicular to the axis O1 on an optical waveguide configuration plane) may exist between the axis O1 and the axis O2, and is denoted as an offset X.

By setting a value of X, total output power of the first output waveguide 125 and the second output waveguide 127 may be increased.

Figure 7:
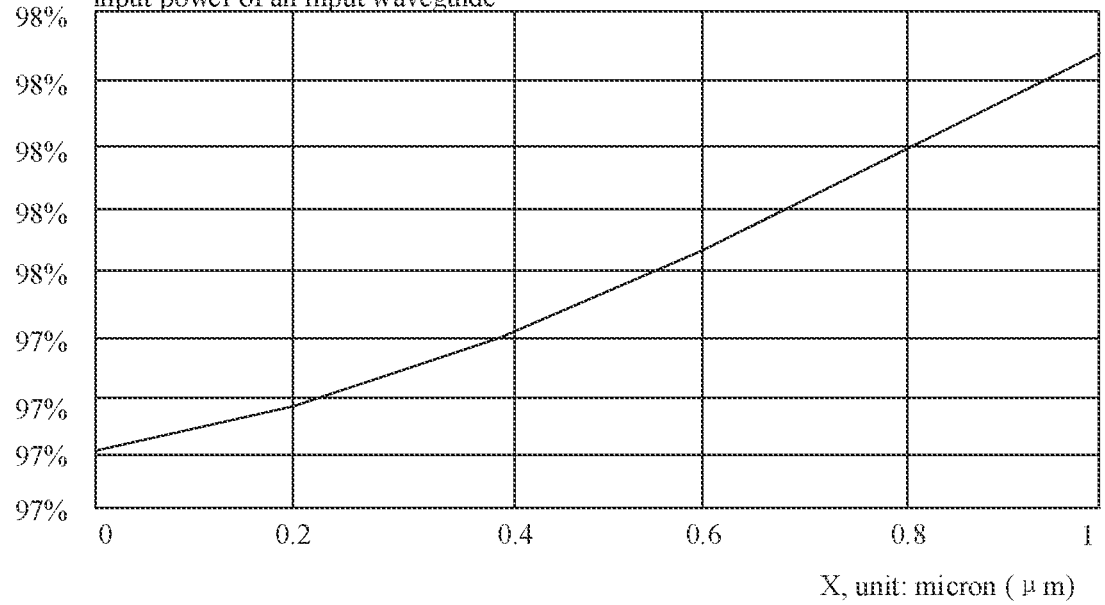
FIG. 7 is a schematic diagram of a relationship between an offset and power that are between an optical axis of an input waveguide and an optical axis of a tapered waveguide according to this application.

FIG. 7 shows a relationship between the value of X and a first percentage, where the first percentage is a percentage of the total output power of the first output waveguide 125 and the second output waveguide 127 to input power of the input waveguide 121.

As an example instead of a limitation, the axis O1 may be located on a side that is of the axis O2 and that is close to an output waveguide with a larger width, or the axis O1 may be located on a side that is of the axis O2 and that is close to an output waveguide with higher power. For example, as shown in FIG. 2, in this application, the axis O1 may be located on a side that is of the axis O2 and that is close to the first output waveguide 125. A signal light loss may be effectively reduced.

Alternatively, the axis O1 may be located on a side that is of the axis O2 and that is close to an output waveguide with a smaller width, or the axis O1 may be located on a side that is of the axis O2 and that is close to an output waveguide with lower power.

Figure 8:
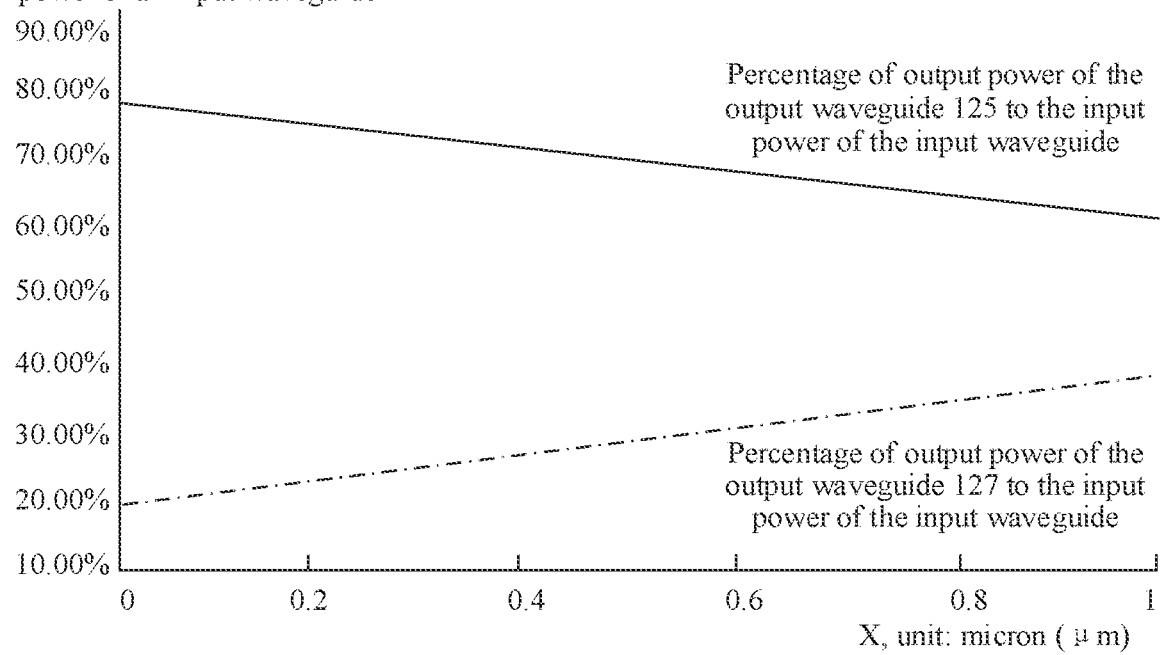
FIG. 8 is another schematic diagram of a relationship between an offset and power that are between an optical axis of an input waveguide and an optical axis of a tapered waveguide according to this application.

FIG. 8 shows a relationship between a value of X and each second percentage when the axis O1 may be located on a side that is of the axis O2 and that is close to an output waveguide with a larger width (for example, the configuration manner shown in FIG. 2 or FIG. 4). A second percentage is a percentage of power of an output waveguide to the input power of the input waveguide 121.

As shown in FIG. 8, when the axis O1 is located on a side that is of the axis O2 and that is close to an output waveguide with a larger width, a larger value of X indicates a smaller percentage of output power of the first output waveguide 125 to the input power of the input waveguide 121 and a larger percentage of output power of the second output waveguide 127 to the input power of the input waveguide 121. It should be understood that, structures of the uneven optical splitting unit 110 in this application in FIG. 2 to FIG. 4 are merely examples for description, and this application is not limited thereto. For example, the uneven optical splitting unit 110 shown in FIG. 5 may not include a tapered waveguide.

In other words, as shown in FIG. 5, the uneven optical splitting unit 110 includes: an input waveguide 121, a first output waveguide 125, and a second output waveguide 127.

The following describes a relationship between components of the uneven optical splitting unit 110 shown in FIG. 5 with reference to a flow direction of signal light in the uneven optical splitting unit 110.

As shown in FIG. 5, the input waveguide 121 is configured to receive first signal light from the input port 101.

As an example instead of a limitation, the input waveguide 121 may be a planar lightwave circuit.

For example, the input waveguide 121 may be a straight waveguide, or the input waveguide 121 may be a bent waveguide. This is not particularly limited in this application.

The input waveguide 121 has a waveguide center axis, namely, the axis O1.

Figure 9:
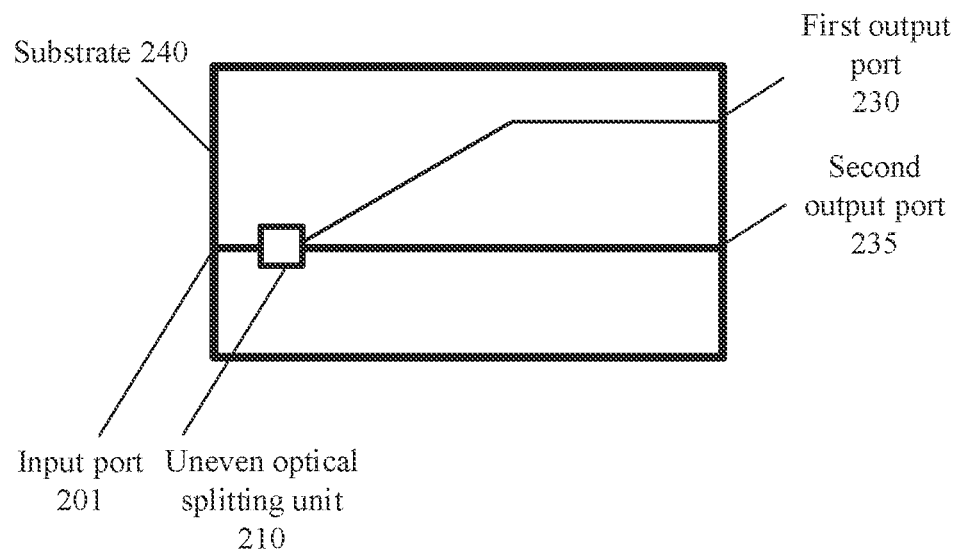
FIG. 9 is a schematic structural diagram of another example of an optical splitter chip according to this application.

As shown in FIG. 9, in this application, the input waveguide 121 may be formed as a rectangle. In other words, a width of an input end of the input waveguide 121 may be the same as or approximately the same as a width of an output end of the input waveguide 121.

The output end of the input waveguide 121 is coupled to the input end of the output waveguide 125, and the output end of the input waveguide 121 is coupled to an input end of the output waveguide 127. In other words, a part of first signal light output from the input waveguide 121 is input to the output waveguide 125, and a part of the first signal light is input to the output waveguide 127.

As an example instead of a limitation, the first output waveguide 125 may be a planar lightwave circuit.

For example, the input waveguide 121 may be a straight waveguide or a bent waveguide.

As shown in FIG. 5, the output end of the input waveguide 121 is coupled to the input end of the first output waveguide 125. In other words, a part of the first signal light (denoted as second signal light) output from the output end of the input waveguide 121 may be input to the first output waveguide 125.

For example, the first output waveguide 125 may be a straight waveguide or a bent waveguide.

In addition, as shown in FIG. 5, the output end of the input waveguide 121 is coupled to the input end of the second output waveguide 127. In other words, a part of the first signal light (denoted as third signal light) output from the output end of the input waveguide 121 may be input to the second output waveguide 127.

For example, the second output waveguide 127 may be a straight waveguide or a bent waveguide.

As shown in FIG. 5, in this application, the first output waveguide 125 and the second output waveguide 127 are arranged along a width direction of the input waveguide 121 (specifically, the output end of the input waveguide 121).

In an embodiment of this application, a width (denoted as D3) of the first output waveguide 125 is different from a width (denoted as D4) of the second output waveguide 127.

Specific setting manners of D3 and D4 may be similar to the setting manners shown in FIG. 2 to FIG. 5. Herein, to avoid repetition, detailed descriptions thereof are omitted.

For example, the width of the first output waveguide 125 may be less than or equal to a width of the input waveguide 121.

In addition, the width of the second output waveguide 127 may be less than or equal to the width of the input waveguide 121.

In addition, the width of the first output waveguide 125 may be greater than the width of the second output waveguide 127.

For example, when the width of the first output waveguide 125 is equal to the width of the input waveguide 121, an optical axis of the first output waveguide 125 may coincide with the axis O1.

In addition, in a width direction of the input waveguide 121, an optical axis of the second output waveguide 127 may be below the axis O1.

In addition, it should be understood that the foregoing listed structure of the uneven optical splitting unit 110 is merely an example for description, and this application is not limited thereto.

For example, the uneven optical splitting unit 110 may also be a fused fiber taper splitting unit (or an optical splitting unit formed by using a fused fiber taper method).

The fused fiber taper method is: Two (or more) fibers without coating layers are closely placed by using a method, heated and fused at a high temperature, and stretched to both ends at the same time, and finally a special waveguide structure is formed in a biconic form in a heating area. Different split ratios may be obtained by controlling a twisting angle and a stretching length of the fibers. Finally, the tapered area is cured with a curing adhesive in a quartz substrate and inserted into a stainless copper tube, thereby forming a light splitter.

For another example, the uneven optical splitting unit 110 may further include three or more output waveguides.

For example, some (two or more) of the three or more output waveguides may be directly connected to an output port of an optical splitter chip.

In addition, some (one or more) of the three or more output waveguides may be connected to an even optical splitting unit.

For another example, some (two or more) of the three or more output waveguides may have a first width (for example, D3), and some (one or more) of the three or more output waveguides may have a second width (for example, D4).

For another example, widths between any two waveguides in some of the three or more output waveguides may be different.

The following describes in detail a structure and a function of the even optical splitting unit group 120 in this application.

In this application, the even optical splitting unit group 120 includes at least one even optical splitting unit 125.

For example, as shown in FIG. 1, the even optical splitting unit group 120 includes seven even optical splitting units 125.

It should be noted that, in this application, the even optical splitting unit group 120 may also be referred to as an even optical splitting unit component. A quantity of even optical splitting units 125 included in the even optical splitting unit group 120 may be determined based on a quantity of second output ports 135 that are expected to be configured.

For example, in this application, the plurality of even splitting units 125 may be arranged (or coupled) in a tree shape.

To be specific, the plurality of even optical splitting units 125 include one root node. The root node includes two first-level subnodes. The root node may equally (or evenly) split input signal light into two channels of signal light of same optical power, and output the two channels of signal light respectively to the two first-level subnodes. Each of the two first-level subnodes may further include two second-level subnodes. Further, the input signal light is split into two channels of signal light of same optical power and the two channels of signal light of the same power are output to the second-level subnodes respectively. In other words, if a quantity of levels of subnodes existing in the plurality of even optical splitting units 125 is P a quantity of second output ports 135 may be $2^{P+1}$.

As an example instead of a limitation, the even optical splitting unit 125 may be a planar lightwave circuit.

The following describes in detail a change status of signal light in the optical splitter chip 100 in this application.

For example, an external device (for example, an optical fiber array) may input signal light (for example, first signal light) to the input port 101. Then, the first signal light is input to the uneven optical splitting unit 110 through the input port 101, and is at least further split into second signal light and third signal light of different optical power. The second signal light is output to the first output port 130 by the first output waveguide 125 of the uneven optical splitting unit 110, and then output to an external device (for example, a port of an optical connector) through the first output port 130. The third signal light is output to the even optical splitting unit group 120 by the second output waveguide 127 of the uneven optical splitting unit 110, and is further split into a plurality of equal signal light of same optical power. The plurality of equal signal light is output to each second output port 135 from the even optical splitting unit group 120, and then output to an external device (for example, a plurality of ports of an optical connector) through the second output ports 135.

Based on the optical splitter chip provided in this application, one beam of signal light may be split into signal light of at least two magnitudes of power, where signal light of one magnitude of power may be at least two beams and signal light of another magnitude of power may be at least one beam, so that optical splitter miniaturization can be implemented.

As an example instead of a limitation, in this application, power of signal light output from the first output port 130 may be higher than power of signal light output from the second output ports 135.

Therefore, because the power of the signal light output from the first output port 130 is higher, the signal light may be used as signal light transmitted on a backbone line. In other words, the signal light output from the first output port 130 may be transmitted to a far-end device.

Because the power of the signal light output from the second output ports 135 is lower, the signal light may be used as signal light transmitted on a branch line. In other words, the signal light output from the second output ports 135 may be transmitted to a near-end device.

It should be understood that, the foregoing listed structure of the optical splitter chip and the included components are merely examples for description, and this application is not limited thereto. For example, the optical splitter chip may further include a cover (for example, a glass cover). The cover may cover the uneven optical splitting unit 110 and the even optical splitting unit group 120. In other words, the uneven optical splitting unit 110 and the even optical splitting unit group 120 may be between the substrate and the cover.

Based on the optical splitter chip provided in this application, the uneven optical splitting unit is disposed, and one of the two channels of signal light of different power output by the uneven optical splitting unit is output to the even optical splitting unit group, so that a plurality of channels of signal light of same power may be output by the even optical splitting unit group. Therefore, one beam of signal light may be split into signal light of at least two magnitudes of power, where signal light of one magnitude of power may be at least two beams. Therefore, a requirement of signal light of different power may be flexibly met, and practicability of an optical splitter chip may further be improved.

In addition, the uneven optical splitting unit and the even optical splitting unit are simultaneously configured on a same chip substrate, so reliability is effectively improved and an optical power loss of signal light is lower. In addition, on a premise of implementing even optical splitting and uneven optical splitting, a size of a component is smaller, and a volume of the component occupied for mounting in an optical fiber box is reduced. In addition, in a production process, a worker does not need to assemble an even optical splitter and an uneven optical splitter; the engineering personnel may directly perform assembling during on-site construction, thereby reducing working hours and labor costs. In addition, material costs may also be reduced.

FIG. 9 is a schematic structural diagram of an optical splitter chip 200 according to this application.

As shown in FIG. 9, the optical splitter chip 200 includes: a substrate 240.

An input port 201, an uneven optical splitting unit 210, a first output port 230, and a second output port 235 are configured on the substrate 240.

The substrate 240 includes a configuration plane, on which the uneven optical splitting unit 210 is configured.

The following describes a relationship between components of the optical splitter chip 200 with reference to a flow direction of signal light in the optical splitter chip 200.

The input port 201 is configured to receive signal light, for example, first signal light sent by an external device.

As shown in FIG. 9, the input port 201 is coupled to an input end of the uneven optical splitting unit 210. In other words, first signal light received from the input port 201 may be input to the uneven optical splitting unit 210.

The uneven optical splitting unit 210 may split the first signal light into two channels of signal light, for example, second signal light and third signal light. Power of the second signal light and the third signal light that are obtained after splitting by the uneven optical splitting unit 210 is different. Subsequently, the process is described in detail.

As shown in FIG. 9, an output end of the uneven optical splitting unit 210 is coupled to the first output port 230. In other words, one of the two channels of signal light obtained after splitting by the uneven optical splitting unit 210, for example, the second signal light, is input to the first output port 230.

In addition, as shown in FIG. 9, the other output end of the uneven optical splitting unit 210 is coupled to the second output port 235. In other words, the other of the two channels of signal light obtained after splitting by the uneven optical splitting unit 210, for example, the third signal light, is input to the second output port 235.

A structure of the uneven optical splitting unit may be similar to a structure of the uneven optical splitting unit 110 in FIG. 2 to FIG. 5. Herein, to avoid repetition, detailed descriptions thereof are omitted.

Based on the optical splitter chip provided in this application, the uneven optical splitting unit is disposed, and one of the two channels of signal light of different power output by the uneven optical splitting unit is output to the even optical splitting unit group, so that a plurality of channels of signal light of same power may be output by the even optical splitting unit group. Therefore, one beam of signal light may be split into signal light of at least two magnitudes of power, where signal light of one magnitude of power may be at least two beams. Therefore, a requirement of signal light of different power may be flexibly met, and practicability of an optical splitter chip may further be improved.

Figure 10:
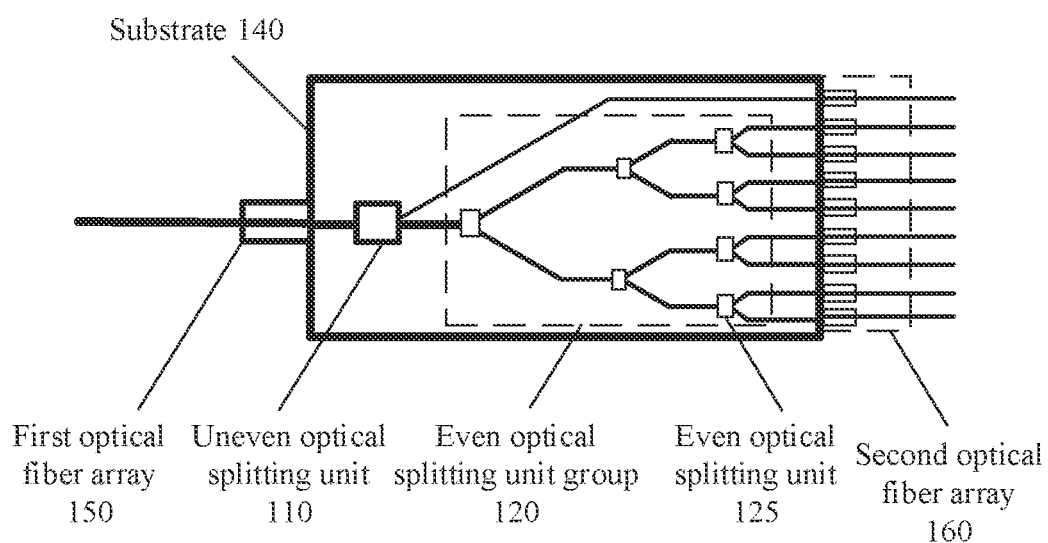
FIG. 10 is a schematic structural diagram of an example of an optical splitter component according to this application.

FIG. 10 is a schematic structural diagram of an example of an optical splitter component according to this application.

As shown in FIG. 10, the optical splitter component includes:

an optical splitter chip, where a function and a structure of the optical splitter chip may be the same as or similar to a structure of the foregoing optical splitter chip 200, and herein, to avoid repetition, detailed descriptions thereof are omitted;

a first optical fiber array 150, including a first fastener and a first optical fiber, where a first end of the first optical fiber is fastened in the first fastener, the first fastener is connected to the substrate of the optical splitter chip, and the first end of the first optical fiber is coupled to an input port of the optical splitter chip and is configured to transmit the received first signal light to the input port; and a second optical fiber array 160, including a second fastener, a second optical fiber, and at least two third optical fibers, where a first end of the second optical fiber is fastened in the second fastener, and first ends of the third optical fibers are separately fastened in the second fastener; the second fastener is connected to the substrate of the optical splitter chip, and the first end of the second optical fiber is coupled to a first output port of the optical splitter chip; and the first ends of the third optical fibers are coupled to the second output ports in a one-to-one correspondence.

Optionally, the optical splitter chip may further include a cover.

In addition, the first fastener may further be connected to the cover of the optical splitter chip.

In addition, the second fastener is connected to the cover of the optical splitter chip.

Figure 11:
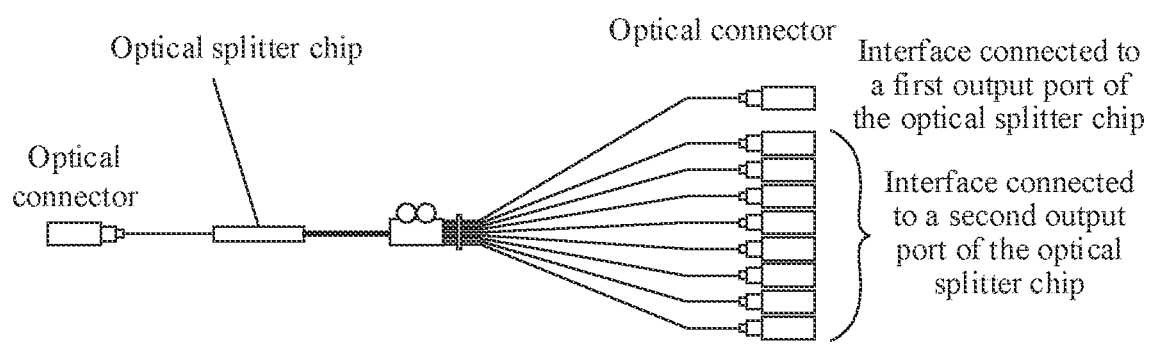
FIG. 11 is a schematic structural diagram of an example of an optical splitter apparatus according to this application.

FIG. 11 is a schematic structural diagram of an example of an optical splitter apparatus according to this application.

As shown in FIG. 11, the optical splitter apparatus includes:

an optical splitter chip, where a function and a structure of the optical splitter chip may be the same as or similar to a structure of the foregoing optical splitter chip 200, and herein, to avoid repetition, detailed descriptions thereof are omitted;

a first optical fiber array, including a first fastener and a first optical fiber, where a first end of the first optical fiber is fastened in the first fastener; the first fastener is connected to the substrate of the optical splitter chip; and the first end of the first optical fiber is coupled to an input port of the optical splitter chip and is configured to transmit the received first signal light to the input port;

a second optical fiber array, including a second fastener, a second optical fiber, and at least two third optical fibers, where a first end of the second optical fiber is fastened in the second fastener, and first ends of the third optical fibers are separately fastened in the second fastener; the second fastener is connected to the substrate of the optical splitter chip, and the first end of the second optical fiber is coupled to a first output port of the optical splitter chip; and the first ends of the third optical fibers are coupled to the second output ports in a one-to-one correspondence;

a first connector, disposed at a second end of the first optical fiber;

a second connector, disposed at a second end of the second optical fiber; and at least two third connectors, disposed at second ends of the third optical fibers in a one-to-one correspondence.

Optionally, the optical splitter chip may further include a cover,

In addition, the first fastener may further be connected to the cover of the optical splitter chip.

In addition, the second fastener is connected to the cover of the optical splitter chip.

An optical fiber box is further provided in this application. The optical fiber box may include the optical splitter apparatus shown in FIG. 11, and a housing that accommodates the optical splitter components.

As an example instead of a limitation, the optical fiber box may include but is not limited to at least one of the following devices:

an optical fiber cabinet, which may also be called as an optical distribution frame (ODF);

a fiber access terminal (FAT);

a fiber distribution terminal (FDT);

an access terminal box (ATB);

a terminal box (TB); and a splitting and splicing closure (SSC).

A person skilled in the art may use different methods to implement the described functions for each particular application, but it should not be considered that the implementation goes beyond a scope of this application.

It may be clearly understood by a person skilled in the art that, for the purpose of convenient and brief description, for a detailed working process of the foregoing system, apparatus, and units, refer to a corresponding process in the foregoing method embodiments, and details are not described herein again.

In the several embodiments provided in this application, it should be understood that the disclosed system and apparatus may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical splitter chip, comprising a substrate, wherein the substrate is configured with:
   an input port, the input port configured to receive first signal light;
   an uneven optical splitting unit, the uneven optical splitting unit configured to split the first signal light into at least second signal light and third signal light, wherein optical power of the second signal light is different from optical power of the third signal light, and wherein the uneven optical splitting unit comprises:
      an input waveguide, the input waveguide configured to transmit the first signal light received by the input port;
      a first output waveguide, the first output waveguide configured to receive the first signal light and output the second signal light to a first output port;
      a second output waveguide, the second output waveguide configured to receive the first signal light and output the third signal light to an even optical splitting unit group, wherein the first output waveguide has a width-3, the second output waveguide has a width-4, and the width-3 is different from the width-4; and
      a tapered waveguide, formed as an isosceles trapezoid, comprising an input end and an output end, wherein the input end is coupled to the input waveguide, the first signal light output from the input waveguide is input to the tapered waveguide from the input end, the first signal light is transmitted to the output end, a width-1 of the output end is greater than a width-2 of the input end, and the first output waveguide and the second output waveguide are arranged along a width direction of the tapered waveguide; and
   wherein the first output waveguide and the second output waveguide are separately coupled to the output end of the tapered waveguide, and in the width direction of the tapered waveguide, a central axis of the input waveguide is located on a side that is close to an output waveguide with a larger width of the first output waveguide and the second output waveguide.

2. The optical splitter chip according to claim 1, wherein a direction of the central axis of the input waveguide is parallel to a direction of the central axis of the tapered waveguide.

3. The optical splitter chip according to claim 1, wherein a larger ratio of the width-3 to the width-4 indicates a larger optical power ratio of the second signal light to the third signal light.

4. The optical splitter chip according to claim 1, wherein the input waveguide has a width-5, wherein the width-5 is greater than or equal to the width-3, and wherein the width-5 is greater than or equal to the width-4.

5. The optical splitter chip according to claim 1, wherein the input waveguide has a width-5, and wherein the width-5 is the same as the width-2.

6. The optical splitter chip according to claim 1, wherein the input waveguide, the tapered waveguide, the first output waveguide, and the second output waveguide are planar lightwave circuits (PLCs).

7. The optical splitter chip according to claim 1, wherein the first output waveguide and the second output waveguide are bent waveguides.

8. The optical splitter chip according to claim 1, further comprising:
   an even optical splitting unit group comprising at least one even optical splitting unit, the even optical splitting unit group configured to split the third signal light into at least two channels of equal signal light, wherein optical power of the at least two channels of equal signal light is the same; and
   at least two second output ports, which are in a one-to-one correspondence with the at least two channels of equal signal light, wherein each second output port is configured to output corresponding equal signal light.

9. The optical splitter chip according to claim 8, wherein the even optical splitting unit is a planar lightwave circuit (PLC).

10. An optical splitter component, comprising:
    an optical splitter chip, comprising a substrate, wherein the substrate is configured with:
       an input port, the input port configured to receive first signal light;
       an uneven optical splitting unit, the uneven optical splitting unit configured to split the first signal light into at least second signal light and third signal light, wherein optical power of the second signal light is different from optical power of the third signal light, and wherein the uneven optical splitting unit comprises:
          an input waveguide, the input waveguide configured to transmit the first signal light received by the input port;
          a first output waveguide, the first output waveguide configured to receive the first signal light and output the second signal light to a first output port;
          a second output waveguide, the second output waveguide configured to receive the first signal light and output the third signal light to an even optical splitting unit group, wherein the first output waveguide has a width-3, the second output waveguide has a width-4, and the width-3 is different from the width-4; and
          a tapered waveguide, formed as an isosceles trapezoid, comprising an input end and an output end, wherein the input end is coupled to the input waveguide; the first signal light output from the input waveguide is input to the tapered waveguide from the input end, the first signal light is transmitted to the output end, a width-1 of the output end is greater than a width-2 of the input end, and the first output waveguide and the second output waveguide are arranged along a width direction of the tapered waveguide; and wherein the first output waveguide and the second output waveguide are separately coupled to the output end of the tapered waveguide, and in the width direction of the tapered waveguide, a central axis of the input waveguide is located on a side that is close to an output waveguide with a larger width of the first output waveguide and the second output waveguide; and a first optical fiber array, comprising a first fastener and a first optical fiber, wherein a first end of the first optical fiber is fastened in the first fastener, wherein the first fastener is connected to the substrate of the optical splitter chip, and wherein the first end of the first optical fiber is coupled to an input port of the optical splitter chip and is configured to transmit the received first signal light to the input port.

11. The optical splitter component according to claim 10, further comprising:

an even optical splitting unit group comprising at least one even optical splitting unit, the even optical splitting unit group configured to split the third signal light into at least two channels of equal signal light, wherein optical power of the at least two channels of equal signal light is the same; and at least two second output ports, which are in a one-to-one correspondence with the at least two channels of equal signal light, wherein each second output port is configured to output corresponding equal signal light.

12. The optical splitter component according to claim 11, further comprising:

a second optical fiber array, comprising a second fastener, a second optical fiber, and at least two third optical fibers, wherein a first end of the second optical fiber is fastened in the second fastener, wherein first ends of the third optical fibers are separately fastened in the second fastener, wherein the second fastener is connected to the substrate of the optical splitter chip, wherein the first end of the second optical fiber is coupled to a first output port of the optical splitter chip, and wherein the first ends of the third optical fibers are coupled to the second output ports in a one-to-one correspondence.

13. The optical splitter component according to claim 10, wherein a direction of the central axis of the input waveguide is parallel to a direction of the central axis of the tapered waveguide.

14. The optical splitter component according to claim 10, wherein a larger ratio of the width-3 to the width-4 indicates a larger optical power ratio of the second signal light to the third signal light.

15. The optical splitter component according to claim 10, wherein the input waveguide has a width-5, wherein the width-5 is greater than or equal to the width-3, and wherein the width-5 is greater than or equal to the width-4.

16. The optical splitter component according to claim 10, wherein the input waveguide has a width-5, and wherein the width-5 is the same as the width-2.

17. The optical splitter component according to claim 10, wherein the input waveguide, the tapered waveguide, the first output waveguide, and the second output waveguide are planar lightwave circuits (PLCs).

18. The optical splitter component according to claim 10, wherein the first output waveguide and the second output waveguide are bent waveguides.

19. An optical splitter apparatus, comprising:

an optical splitter chip, comprising a substrate, wherein the substrate is configured with:

an input port, the input port configured to receive first signal light;

an uneven optical splitting unit, the uneven optical splitting unit configured to split the first signal light into at least second signal light and third signal light, wherein optical power of the second signal light is different from optical power of the third signal light, and wherein the uneven optical splitting unit comprises:

an input waveguide, the input waveguide configured to transmit the first signal light received by the input port;

a first output waveguide, the first output waveguide configured to receive the first signal light and output the second signal light to a first output port;

a second output waveguide, the second output waveguide configured to receive the first signal light and output the third signal light to an even optical splitting unit group, wherein the first output waveguide has a width-3, the second output waveguide has a width-4, and the width-3 is different from the width-4; and a tapered waveguide, formed as an isosceles trapezoid, comprising an input end and an output end, wherein the input end is coupled to the input waveguide, the first signal light output from the input waveguide is input to the tapered waveguide from the input end, the first signal light is transmitted to the output end, a width-1 of the output end is greater than a width-2 of the input end, and the first output waveguide and the second output waveguide are arranged along a width direction of the tapered waveguide; and wherein the first output waveguide and the second output waveguide are separately coupled to the output end of the tapered waveguide, and in the width direction of the tapered waveguide, a central axis of the input waveguide is located on a side that is close to an output waveguide with a larger width of the first output waveguide and the second output waveguide;

a first optical fiber array, comprising a first fastener and a first optical fiber, wherein a first end of the first optical fiber is fastened in the first fastener, wherein the first fastener is connected to the substrate of the optical splitter chip, and wherein the first end of the first optical fiber is coupled to an input port of the optical splitter chip and is configured to transmit the received first signal light to the input port; and a first connector, disposed at a second end of the first optical fiber.

20. An optical fiber box, comprising:

an optical splitter apparatus, comprising:

an optical splitter chip, comprising a substrate, wherein the substrate is configured with:

an input port, the input port configured to receive first signal light;

an uneven optical splitting unit, the uneven optical splitting unit configured to split the first signal light into at least second signal light and third signal light, wherein optical power of the second signal light is different from optical power of the third signal light, and wherein the uneven optical splitting unit comprises:
an input waveguide, the input waveguide configured to transmit the first signal light received by the input port;
a first output waveguide, the first output waveguide configured to receive the first signal light and output the second signal light to a first output port;
a second output waveguide, the second output waveguide configured to receive the first signal light and output the third signal light to an even optical splitting unit group, wherein the first output waveguide has a width-3, the second output waveguide has a width-4, and the width-3 is different from the width-4; and
a tapered waveguide, formed as an isosceles trapezoid, comprising an input end and an output end, wherein the input end is coupled to the input waveguide, the first signal light output from the input waveguide is input to the tapered waveguide from the input end, the first signal light is transmitted to the output end, a width-1 of the output end is greater than a width-2 of the input end, and the first output waveguide and the second output waveguide are arranged along a width direction of the tapered waveguide; and
wherein the first output waveguide and the second output waveguide are separately coupled to the output end of the tapered waveguide, and in the width direction of the tapered waveguide, a central axis of the input waveguide is located on a side that is close to an output waveguide with a larger width of the first output waveguide and the second output waveguide;
a first optical fiber array, comprising a first fastener and a first optical fiber, wherein a first end of the first optical fiber is fastened in the first fastener, wherein the first fastener is connected to the substrate of the optical splitter chip, and wherein the first end of the first optical fiber is coupled to an input port of the optical splitter chip and is configured to transmit the received first signal light to the input port;
a first connector, disposed at a second end of the first optical fiber; and
a housing accommodating the optical splitter apparatus.

* * * * *